United States Patent
Bender

(10) Patent No.: US 12,334,857 B2
(45) Date of Patent: Jun. 17, 2025

(54) METHOD FOR ASCERTAINING A ROTARY POSITION, METHOD FOR ASCERTAINING AN ELECTRICAL ANGULAR POSITION AND METHOD FOR DRIVING AN ELECTRIC MOTOR

(71) Applicant: Schaeffler Technologies AG & Co. KG, Herzogenaurach (DE)

(72) Inventor: Marco Bender, Sasbachwalden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 100 days.

(21) Appl. No.: 18/039,025

(22) PCT Filed: May 28, 2021

(86) PCT No.: PCT/DE2021/100464
§ 371 (c)(1),
(2) Date: May 26, 2023

(87) PCT Pub. No.: WO2022/117136
PCT Pub. Date: Jun. 9, 2022

(65) Prior Publication Data
US 2024/0007029 A1    Jan. 4, 2024

(30) Foreign Application Priority Data

Dec. 4, 2020   (DE) ...................... 10 2020 132 310.7
May 21, 2021  (DE) ...................... 10 2021 113 301.7

(51) Int. Cl.
| | | |
|---|---|---|
| H02P 8/34 | (2006.01) | |
| H02P 6/12 | (2006.01) | |
| H02P 6/16 | (2016.01) | |

(52) U.S. Cl.
CPC . *H02P 6/16* (2013.01); *H02P 6/12* (2013.01)

(58) Field of Classification Search
CPC ..... H02P 8/34; H02P 6/16; H02P 6/12; G03G 15/55
See application file for complete search history.

(56) References Cited

U.S. PATENT DOCUMENTS

| | | |
|---|---|---|
| 4,507,591 A | 3/1985 | Kelleher |
| 10,389,283 B2 * | 8/2019 | Mizuo ....................... H02P 8/34 |

(Continued)

FOREIGN PATENT DOCUMENTS

| | | |
|---|---|---|
| DE | 102005024879 A1 | 12/2006 |
| DE | 102008005054 A1 | 1/2009 |

(Continued)

*Primary Examiner* — Cortez M Cook
(74) *Attorney, Agent, or Firm* — Matthew V. Evans

(57) ABSTRACT

A method is provided for ascertaining a rotary position of a rotor, which is assigned to an electric motor and which is able to rotate about an axis of rotation with respect to a stator and the rotary position of which is ascertained by at least one measurement value of a rotary sensor by virtue of at least one measurement value of the rotary sensor being compared at a first time during operation of the rotor with a stored sensor measurement value reference. The method includes calculating the rotary position present at the rotor at the first time based on a comparison between a sequence of measurement values and a sequence of reference values. The stored sensor measurement value reference includes the sequence of reference values, and the reference values are previously stored measurement values of the rotary sensor at various rotary positions of the rotary sensor. The measurement values recorded before the first time are stored as the sequence of measurement values.

18 Claims, 3 Drawing Sheets

(56) References Cited

U.S. PATENT DOCUMENTS

| | | | |
|---|---|---|---|
| 2006/0006822 A1* | 1/2006 | Kro | G01D 5/145 318/400.02 |
| 2019/0367093 A1 | 12/2019 | Suzuki et al. | |
| 2020/0235680 A1* | 7/2020 | Kameyama | G03G 15/55 |

FOREIGN PATENT DOCUMENTS

| | | |
|---|---|---|
| DE | 102013109877 A1 | 3/2015 |
| DE | 102016207643 A1 | 11/2017 |
| DE | 102018110075 A1 | 10/2019 |
| DE | 102019126113 A1 | 4/2021 |
| GB | 2483177 A | 2/2012 |

* cited by examiner

METHOD FOR ASCERTAINING A ROTARY POSITION, METHOD FOR ASCERTAINING AN ELECTRICAL ANGULAR POSITION AND METHOD FOR DRIVING AN ELECTRIC MOTOR

CROSS-REFERENCE TO RELATED APPLICATIONS

This application is the U.S. National Phase of PCT Appln. No. PCT/DE2021/100464 filed May 28, 2021, which claims priority to DE 102021113301.7 filed May 21, 2021, which in turn claims priority to DE 102020132310.7 filed Dec. 4, 2020, the entire disclosures of which are incorporated by reference herein.

TECHNICAL FIELD

The present disclosure relates to a method for ascertaining a rotary position of a rotor, to a method for ascertaining an electrical angular position and to a method for driving an electric motor.

BACKGROUND

DE 10 2016 207 643 A1 describes a method for ascertaining a position of a rotor of an electric motor with respect to a stator of the electric motor, wherein the rotor has permanent magnets and a magnetic sensor with a plurality of magnetic poles, the stator has three-phase windings and at least one magnetic field sensor, and the electric motor is electronically commutated step-by-step under sensor control, wherein the rotor is moved with respect to the stator, signals of the at least one magnetic field sensor are detected in several commutation steps and a position of the rotor with respect to the stator is ascertained taking into account the signals of the at least one magnetic field sensor ascertained in the several commutation steps.

SUMMARY

The present disclosure provides, according to an exemplary embodiment, a method to more precisely ascertain the rotary position of a rotor. The electric motor should be controlled more precisely. The electric motor should be operated more efficiently and built more cost-effectively. As a result, the rotary position of the rotor can be ascertained accurately and reliably during operation of the electric motor. The electric motor can be designed cost-effectively.

The electric motor can be arranged in a vehicle. The vehicle can be a hybrid vehicle or an electric vehicle. The electric motor can be arranged in a powertrain of the vehicle. The electric motor can provide drive torque to move the vehicle. The electric motor can bring about an actuation of an actuation element, for example a transmission and/or a clutch.

The electric motor can be a brushless direct current motor. The electric motor can be driven with an AC voltage. The electric motor can have a multi-pole construction.

The rotary sensor can be a rotor bearing sensor. The rotary sensor can have a measurement element and a rotary element. The rotary element can be connected to the rotor and can be rotated about an axis of rotation. The rotary element can be arranged on the front side of the rotor. The rotary element can have a plurality of sub-segments arranged on the peripheral side. The rotary element can have sub-segments arranged on the peripheral side. The sub-segment can be a circular segment. The individual sub-segment can be designed as a magnetized pole pair. The number of sub-segments can be equal to the number n of pole pairs of the electric motor. The measurement element can output an analogue sensor signal. The sensor signal can be a sinusoidal sensor signal or a cosinusoidal sensor signal. If the sub-segments are incorrectly positioned, the rotary position can still be precisely ascertained using the proposed method.

The measurement element can be designed as a Hall sensor. The measurement element may be axially opposite to the rotary element. The measurement element can be fixed to the housing.

The rotary position may be ascertained independently of a rotational speed and/or rotational acceleration of the rotor.

In an embodiment of the present disclosure, it is advantageous if the sequence of measurement values has at least two measurement values which are chronologically immediately before a first time. The sequence of measurement values can have a number of measurement values that corresponds to the number of reference values of the sensor measurement value reference. This allows an exact comparison of the measurement values to be carried out.

An embodiment of the present disclosure provides that the rotary sensor has a first sensor element and a second sensor element, and at least one of the measurement values comprises a first partial measurement value of the first sensor element and a second partial measurement value of the second sensor element. The first partial measurement value can be calculated using a sensor signal from the first sensor element, and the second partial measurement value can be calculated using a sensor signal from the second sensor element. The first sensor element can be designed as a first measurement element. The second sensor element can be designed as a second measurement element. The first and second sensor element can be offset from one another by 90° about the axis of rotation. The first and/or second measurement element can be designed as a Hall sensor.

An embodiment of the present disclosure is advantageous in which each of the reference values and/or the measurement values from the sequence of measurement values comprises the first partial measurement value and the second partial measurement value. The reference value and/or the measurement value can also comprise more than two partial measurement values.

In an embodiment of the present disclosure, it is provided that the first partial measurement value is an amplitude of a sinusoidal sensor signal of the first sensor element. The first partial measurement value can also be a phase and/or an offset of the sinusoidal sensor signal.

In an embodiment of the present disclosure, it is advantageous if the second partial measurement value is an amplitude of a cosinusoidal sensor signal of the second sensor element. The second partial measurement value can also be a phase and/or an offset of the cosinusoidal sensor signal.

In an embodiment of the present disclosure, it is advantageous if the electric motor has n pole pairs and the sensor measurement value reference has at least n reference values. The number of reference values can be equal to the number of pole pairs of the electric motor.

An embodiment of the present disclosure is advantageous in which at least one reference value is assigned to each rotary position corresponding to a respective pole pair. As a result, the rotary position to be ascertained and the electrical period of the electric motor can be limited to the assigned pole pair.

Furthermore, a method, according to an exemplary embodiment, is provided for ascertaining an electrical angular position of a rotor assigned to an electric motor, with which the electrical angular position is ascertained by calculating a course of an angular deviation of the electrical angular position depending on the rotary position ascertained as described above and the electrical angular position is corrected depending on the angular deviation.

Furthermore, a method, according to an exemplary embodiment, is provided for electrically activating an electric motor by commutation depending on an electrical angular position of the rotor ascertained as described above. As a result, the electrical angular position for commutation can be ascertained more precisely. The electrical angular position can be ascertained more independently of mechanical errors and tolerances.

The commutation may be set as a function of the corrected electrical angular position. The corrected electrical angular position can be ascertained more cost-effectively, and the electrical control of the electric motor can be carried out more cost-effectively as a result. The electric motor can be driven more precisely electrically. The angular deviation can form a correction value for the commutation based on the electrical angular position.

The electrical angular position can be calculated from a sensor signal of the rotary sensor, preferably from the sensor signal of the first sensor element and the sensor signal of the second sensor element, preferably via an arctangent function, in particular a tan 2 function. As a result, the electrical angular position can be ascertained precisely and cost-effectively. The cosinusoidal and sinusoidal sensor signals can be used as input signals for calculating the electrical angular position.

Further advantages and advantageous embodiments of the present disclosure result from the description of the figures and the drawings.

BRIEF DESCRIPTION OF THE DRAWINGS

The present disclosure is described in detail below with reference to the drawings. Specifically.

DETAILED DESCRIPTION

Figure 1:
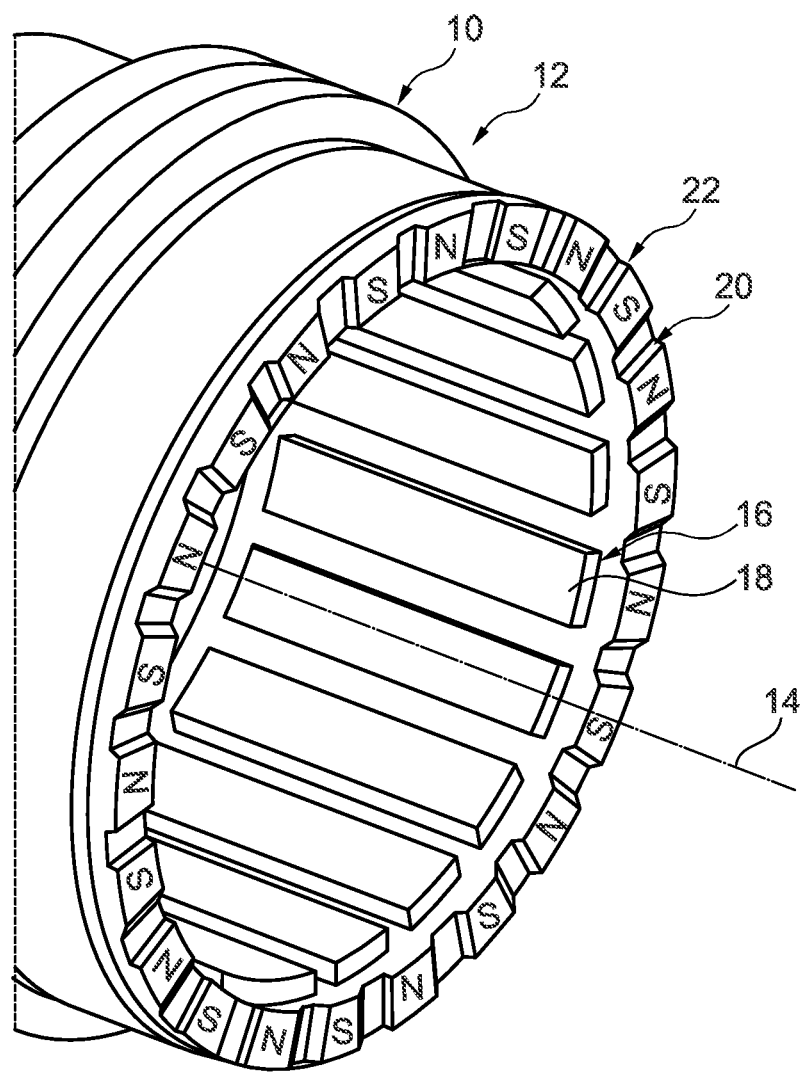
FIG. 1: shows a section of a spatial view of a rotor for use in a method in an embodiment of the present disclosure.

FIG. 1 shows a section of a spatial view of a rotor for use in a method in an exemplary embodiment of the present disclosure. An electric motor 10 comprises a rotor 12, which is able to rotate about an axis of rotation 14 and a stator (not shown here). The stator may be arranged radially inside the rotor 12 and comprises three-phase windings that are electrically controlled by commutation in order to drive the rotor 12.

The electric motor 10 has a multi-pole design and has a number n of pole pairs 16. The pole pairs 16 are formed by permanent magnets 18 which are arranged on an inner circumference of the rotor 12. The permanent magnets 18 are used to follow the magnetic field emanating from the three-phase windings so that the rotor 12 rotates about the axis of rotation 14.

A rotary element 20 constructed in the form of a ring is arranged on the end face of the rotor 12. The rotary element 20 has a predetermined number of sub-segments, which each comprise at least one pole pair 22 and are arranged alternately around the axis of rotation 14 on the circumferential side. The permanent magnets 18 have the same number of pole pairs 16 as the rotary element 20. A pole pair 22 of the rotary element 20 is formed by two oppositely magnetized magnetic poles N, S. The number of permanent magnets 18 is specified by the number of pole pairs 16 of the rotor 12, whereby the number of magnetic poles N, S on the rotary element 20 may be also specified.

A magnetic field of the rotary element 20 can be detected by measurement elements, in particular Hall sensors. The measurement elements can be located axially opposite the rotary element 20 and can be firmly connected to the stator.

Figure 2:
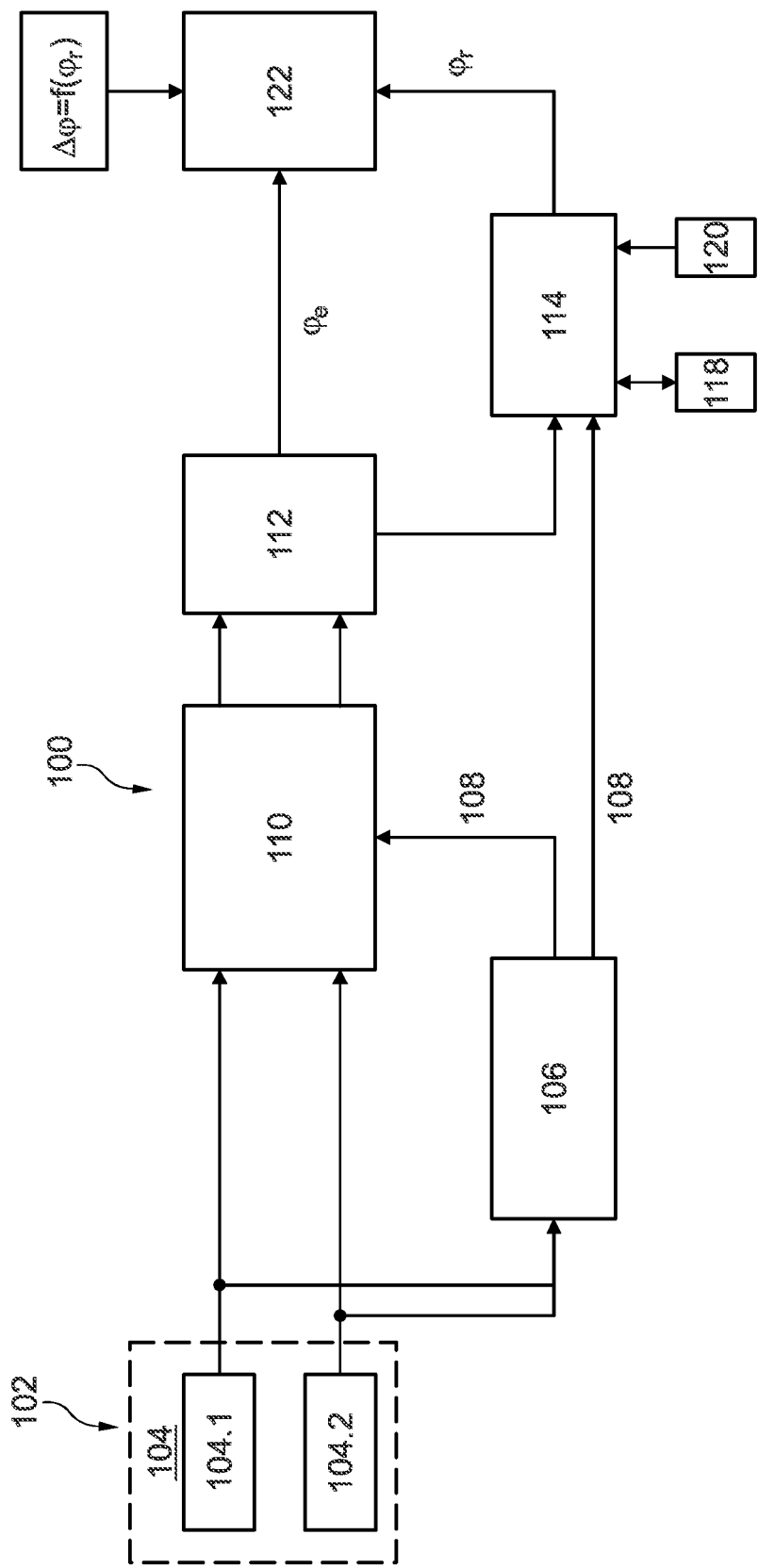
FIG. 2: shows a method for ascertaining a rotary position in an embodiment of the present disclosure.

FIG. 2 shows a method 100 for ascertaining a rotary position in an exemplary embodiment of the present disclosure. The method 100 for ascertaining a rotary position of a rotor can be used during operation of the electric motor. The rotary position of the rotor is ascertained depending on the measurement values from a rotary sensor by virtue of a measurement signal 104 of the rotary sensor being ascertained and recorded in an introductory step 102 at a first time during operation of the rotor. The measurement signal 104 is preferably an analog signal and comprises in particular a sinusoidal sensor signal 104.1 and a cosinusoidal sensor signal 104.2. The sinusoidal sensor signal 104.1 can be provided by a first sensor element of the rotary sensor and the cosinusoidal sensor signal 104.2 can be provided by a second sensor element of the rotary sensor. The measurement signal 104 is processed in a subsequent step 106 and output as a processed measurement signal 108. An amplitude, phase and/or an offset of the respective sensor signal 104.1, 104.2 can be evaluated and processed in a further step 110. Then, in a subsequent step 112, an electrical angular position $\varphi_e$ of the rotor is calculated from this.

Figures 3, 4:
FIG. 3: shows a course of an angular deviation of the electrical angular position from the rotary position.
FIG. 4: shows a sensor measurement value reference and a sequence of measurement values.

Using the processed measurement signal 108 and the electrical angular position $\varphi_e$, the rotary position $\varphi_r$ of the rotor with respect to the axis of rotation is calculated in a subsequent step 114. In this case, a sensor measurement value reference 118 is used, which comprises a fixed sequence of reference values R, as shown in FIG. 4a). The reference values R may be measurement values of the rotary sensor, which are assigned to an actual and checked rotary position of the rotor. The reference values R can be recorded and stored, for example, before commissioning, in particular before initial commissioning, of the rotor and comprise, as shown in FIG. 4a) for the example of a 10-pole electric motor, ten reference values R which each correspond to measurement values which are made up of a first partial measurement value R1, which is, for example, an amplitude of a sinusoidal sensor signal of the first sensor element, and a second partial measurement value R2, which is an amplitude of a cosinusoidal sensor signal of the second sensor element, and are assigned to the respective pole segment k of the rotor. Alternatively, the reference values R can be ascertained during operation of the electric motor, in particular during the step 106.

Referring again to FIG. 2, further, to ascertain the rotary position $\varphi_r$, of the rotor at a first time, the measurement values recorded in time before the first time are used as a sequence 120 of measurement values. As shown in FIG. 4b), the sequence 120 of measurement values M contains the same number of measurement values M as in the sensor measurement value reference. The rotary position present on the rotor at the first time X is calculated as a function of a comparison between the sequence 120 of measurement values X and X−1 to X−9 that precede the time X and the sequence of reference values of the sensor measurement value reference from FIG. 4a). The comparison of the sequence 120 of the measurement values M to the sequence of the reference values R can take place via a cyclic convolution. The comparison can be created and updated during operation of the electric motor in parallel with the determination of the rotary position, without impairing the operation of the electric motor.

With reference to FIG. 2, the ascertained electrical angular position $\varphi_e$ and the rotary position $\varphi_r$ can be used to take into account and correct angular deviations $\Delta\varphi$ ascertained in advance in a subsequent step 122. The commutation of the electric motor can be calculated depending on the ascertained rotary position $\varphi_r$, the electrical angular position $\varphi_e$ and a previously determined course between the angular deviation $\Delta\varphi$ of the electrical angular position $\varphi_e$ depending on the rotary position $\varphi_r$. An example of the course of the angular deviation $\Delta\varphi$ is shown over the rotary position $\varphi_r$ in FIG. 3. Knowing the rotary position $\varphi_r$, the angular deviation $\Delta\varphi$ to be taken into account can be calculated via the stored course of the angular deviation $\Delta\varphi$ to the ascertained rotary position $\varphi_r$. For example, in FIG. 3, there is an angular deviation $\Delta\varphi$ of 5° at the rotary position $\varphi_r$ of 72°.

The sequence of reference values R and a course of angular deviations $\Delta\varphi$ can be determined by a method from the field of encoderless control. The course of the angular deviation $\Delta\varphi$ can be recorded in advance, for example after manufacture of the electric motor and an initial start-up and/or during operation of the electric motor, as in the case of recording the sensor measurement value reference. For example, the course of the deviation can be stored functionally or in a lookup table. When ascertaining the course of the deviation, mechanical tolerances can be taken into account.

In order to distinguish the reference values R of the sensor measurement value reference 118, as indicated in FIG. 4a) and/or the sequence 120 of measurement values M, as indicated in FIG. 4b), the rotary sensor can be suitably modified.

LIST OF REFERENCE SIGNS

10 Electric motor
12 Rotor
14 Axis of rotation
16 Pole pair
18 Permanent magnet
20 Rotary element
22 Pole pair
100 Method
102 Step
104 Measurement signal
104.1 Sensor signal
104.2 Sensor signal
106 Step
108 Processed measurement signal
110 Step
112 Step
114 Step
118 Sensor measurement value reference
120 Sequence
122 Step

The invention claimed is:

1. A method for ascertaining a rotary position of a rotor assigned to an electric motor which is able to rotate about an axis of rotation with respect to a stator and the rotary position of which is ascertained by at least one measurement value of a rotary sensor by virtue of at least one measurement value of the rotary sensor being compared at a first time during operation of the rotor with a stored sensor measurement value reference), comprising calculating the rotary position present at the rotor at the first time based on a comparison between a sequence of measurement values and a sequence of reference values, wherein:
   the stored sensor measurement value reference includes the sequence of reference values and the reference values are previously stored measurement values of the rotary sensor at various rotary positions of the rotary sensor,
   the measurement values recorded before the first time are stored as the sequence of measurement values,
   the rotary sensor has at least a first sensor element and a second sensor element, and
   at least one measurement value in the sequence of measurement values comprises a first partial measurement value of the first sensor element and a second partial measurement value of the second sensor element.

2. The method according to claim 1, wherein the sequence of measurement values has at least two measurement values which are chronologically immediately before the first time.

3. The method according to claim 1, wherein each of the reference values comprises the first partial measurement value and the second partial measurement value.

4. The method according to claim 1, wherein the first partial measurement value is assigned to a sinusoidal sensor signal.

5. The method according to claim 1, wherein the second partial measurement value is assigned to a cosinusoidal sensor signal.

6. A method for ascertaining a rotary position of a rotor assigned to an electric motor which is able to rotate about an axis of rotation with respect to a stator and the rotary position of which is ascertained by at least one measurement value of a rotary sensor by virtue of at least one measurement value of the rotary sensor being compared at a first time during operation of the rotor with a stored sensor measurement value reference), comprising calculating the rotary position present at the rotor at the first time based on a comparison between a sequence of measurement values and a sequence of reference values, wherein:
   the stored sensor measurement value reference includes the sequence of reference values and the reference values are previously stored measurement values of the rotary sensor at various rotary positions of the rotary sensor,
   the measurement values recorded before the first time are stored as the sequence of measurement values, and
   the stored sensor measurement value reference has at least as many reference values in the sequence of reference values as a number of pole pairs of the electric motor.

7. The method according to claim 6, wherein at least one reference value in the sequence of reference values is assigned to each rotary position corresponding to one respective pole pair.

8. A method for ascertaining an electrical angular position of a rotor assigned to an electric motor, wherein the electrical angular position is ascertained by virtue of calculating a course of an angular deviation of the electrical angular position depending on the rotary position ascertained with the method according to claim 1, and correcting the electrical angular position depending on the angular deviation.

9. A method for electrically driving an electric motor by commutation depending on an electrical angular position of the rotor, wherein the commutation takes place depending on the electrical angular position determined according to claim 8.

10. A method for determining a rotary position of a rotor of an electric motor during operation of the electric motor, comprising:
- receiving, from a rotary sensor, a measurement value at a first time of operation of the electric motor;
- updating a sequence of measurement values to include the measurement value at the first time of operation of the electric motor, wherein the sequence of measurement values includes measurement values recorded in time prior to the first time; and
- then calculating the rotary position of the rotor based on comparing the sequence of measurement values to a sensor measurement value reference, wherein:
  - the sensor measurement value reference includes a sequence of reference values that are previously stored measurement values of the rotary sensor at various rotary positions of the rotary sensor, and
  - the sequence of measurement values are compared to the sensor measurement value reference via cyclic convolution.

11. The method of claim 10, wherein the sequence of measurement values has at least two measurement values which are chronologically immediately before the first time.

12. The method of claim 10, wherein the rotary sensor has at least a first sensor element and a second sensor element, the measurement value at the first time of operation includes a first partial measurement value of the first sensor element and a second partial measurement value of the second sensor element.

13. The method of claim 12, wherein each of the reference values includes the first partial measurement value and the second partial measurement value.

14. The method of claim 12, wherein the first partial measurement value is assigned to a sinusoidal sensor signal, and the second partial measurement value is assigned to a cosinusoidal sensor signal.

15. The method of claim 10, wherein the sequence of reference values has at least as many reference values as a number of pole pairs of the electric motor.

16. The method of claim 10, further comprising:
- calculating an electrical angular position of the rotor based on the measurement value at the first time of operation;
- determining an angular deviation of the electrical angular position based on a comparison of the calculated rotary position and a stored course of angular deviation; and
- updating the electrical angular position based on the angular deviation.

17. The method of claim 16, wherein the stored course of angular deviation is recorded prior to the first time.

18. The method of claim 16, further comprising driving the electric motor by commutation based on the updated electrical angular position.

* * * * *